US012651859B2

(12) United States Patent
(10) Patent No.: US 12,651,859 B2
(45) Date of Patent: Jun. 9, 2026

Feng et al.

(54) CABLE CONNECTOR AND ELECTRONIC DEVICE

(71) Applicant: Zhuhai LinkE Technology Co., Ltd, Qianshan Town (CN)

(72) Inventors: Gang Feng, Qianshan Town (CN); Changming Wu, Qianshan Town (CN); Yihong Qi, Qianshan Town (CN); Wei Yu, Qianshan Town (CN)

(73) Assignee: Zhuhai LinkE Technology Co., Ltd, Qianshan Town (CN)

(*) Notice: Subject to any disclaimer, the term of this patent is extended or adjusted under 35 U.S.C. 154(b) by 449 days.

(21) Appl. No.: 18/262,016

(22) PCT Filed: Jan. 22, 2021

(86) PCT No.: PCT/CN2021/073414
§ 371 (c)(1),
(2) Date: Jul. 19, 2023

(87) PCT Pub. No.: WO2022/155927
PCT Pub. Date: Jul. 28, 2022

(65) Prior Publication Data
US 2024/0088594 A1 Mar. 14, 2024

(51) Int. Cl.
*H01R 12/00* (2006.01)
*H01R 13/24* (2006.01)
*H01R 13/6581* (2011.01)

(52) U.S. Cl.
CPC ..... *H01R 13/2407* (2013.01); *H01R 13/6581* (2013.01)

(58) Field of Classification Search
CPC ............ H01R 13/2407; H01R 13/6581; H01R 4/023; H01R 13/6271; H01R 13/6594;
(Continued)

(56) References Cited

U.S. PATENT DOCUMENTS 4,903,402 A * 2/1990 Norton ................. G02B 6/4277 29/843
5,597,326 A * 1/1997 DeLessert .............. H01R 12/79 439/933
(Continued)

FOREIGN PATENT DOCUMENTS

CN 201252188 Y 6/2009
CN 201667436 U 12/2010
(Continued)

OTHER PUBLICATIONS

Notification of Reasons for Refusal issued in Japanese Application No. 2023-544453, mailed on Dec. 3, 2024 (13 pages).
(Continued)

*Primary Examiner* — Abdullah A Riyami
*Assistant Examiner* — Nelson R. Burgos-Guntin
(74) *Attorney, Agent, or Firm* — Osha Bergman Watanabe & Burton LLP

(57) ABSTRACT

The present application provides a cable connector and an electronic device. The cable connector includes a socket and a plug; the socket is provided with an opening and a connection part for connecting with a circuit board; the plug includes a fixing member and an elastic connection member; the elastic connection member each includes a fixing part and a first elastic contact part connected with the fixing part, the fixing part being fixedly connected with the fixing member for connecting with an inner conductor of the cable; the fixing member is capable of connecting with the socket, and enables the first elastic contact part to elastically contact a signal connection contact on the circuit board through the opening to form electrical connection.

18 Claims, 13 Drawing Sheets

(58) Field of Classification Search
CPC .... H01R 12/714; H01R 12/716; H01R 12/79; H01R 13/6585; H01R 13/6582; H01R 13/52
See application file for complete search history.

(56) References Cited

U.S. PATENT DOCUMENTS

| | | | | |
|---|---|---|---|---|
| 6,276,965 | B1 * | 8/2001 | Madsen | H01R 13/6582 439/108 |
| 2003/0017730 | A1 * | 1/2003 | Bassler | H01R 12/716 439/108 |
| 2004/0058572 | A1 * | 3/2004 | Fromm | H01R 13/6461 439/101 |
| 2006/0258213 | A1 | 11/2006 | Ku et al. | |
| 2012/0178282 | A1 * | 7/2012 | Engels | H01R 13/506 29/874 |
| 2015/0340796 | A1 * | 11/2015 | Lu | H01R 24/60 439/352 |
| 2016/0218455 | A1 * | 7/2016 | Sayre | H01R 13/6594 |
| 2018/0006416 | A1 * | 1/2018 | Lloyd | H01R 12/79 |
| 2018/0034175 | A1 * | 2/2018 | Lloyd | H01R 24/60 |

FOREIGN PATENT DOCUMENTS

| | | | |
|---|---|---|---|
| CN | 202503145 | U | 10/2012 |
| CN | 111600155 | A | 8/2020 |
| CN | 112117604 | A | 12/2020 |
| CN | 112928550 | A | 6/2021 |
| JP | S6120076 | A | 1/1986 |
| JP | 2013125694 | A | 6/2013 |
| JP | 2018501622 | A | 1/2018 |
| WO | 2020181223 | A1 | 9/2020 |

OTHER PUBLICATIONS

Office Action issued in corresponding JP Application No. 2023-544453 with English translation dated Jul. 2, 2024 (14 pages).
Extended European Search Report issued in corresponding EP Application No. 21920325.4 dated Sep. 9, 2024 (11 pages).
International Search Report issued for corresponding international patent application No. PCT/CN2021/073414, mailed Oct. 11, 2021 (13 pages).
Written Opinion issued for corresponding international patent application No. PCT/CN2021/073414, mailed Oct. 27, 2021 (3 pages).

* cited by examiner

CABLE CONNECTOR AND ELECTRONIC DEVICE

CROSS-REFERENCE TO RELATED APPLICATIONS

The present application is a national phase entry under 35 USC § 371 of International Application PCT/CN2021/073414, filed Jan. 22, 2021, the entire disclosure of which is incorporated herein by reference.

FIELD

The present application relates to the field of data transmission, in particular to a cable connector and an electronic device.

BACKGROUND

With the continuous progress of technology, the data processing speed of modern network servers and supercomputers is getting faster and faster. Application specific integrated circuits (ASICs) use serial differential signal links to transmit ultra-high-speed data, which can reach up to hundreds of Gbps. On the printed circuit board (PCB) with a complex system and high component density, it is increasingly difficult to find wiring space that meets the requirements of the high-speed differential data transmission. Therefore, it is necessary to use precise cable connectors to directly transmit high-speed differential signals of application specific integrated circuits to required devices. The performance of the cable connector will have a crucial impact on the quality of signal transmission.

SUMMARY

Embodiments of the present application provide a cable connector, which includes a socket and a plug. The socket has an opening and a connection part configured to connect with a circuit board. The plug includes a fixing member and an elastic connection member. The elastic connection member includes a fixing part and a first elastic contact part connected with the fixing part, and the fixing part is fixedly connected with the fixing member and configured to connect with an inner conductor of a cable. The fixing member is configured to be connected with the socket, and enable the first elastic contact part to elastically contact a signal connection contact on the circuit board through the opening to form an electrical connection.

Embodiments of the present application also provide an electronic device including a circuit board, a cable and a cable connector. The cable connector includes a socket and a plug. The socket has an opening and a connection part connected with a circuit board. The plug includes a fixing member and an elastic connection member. The elastic connection member includes a fixing part and a first elastic contact part connected with the fixing part, and the fixing part is fixedly connected with the fixing member and connected with an inner conductor of the cable. The fixing member is configured to be connected with the socket, and enable the first elastic contact part to elastically contact a signal connection contact on the circuit board through the opening to form an electrical connection.

The electronic device according to embodiments of the present application has stable and reliable signal.

In some embodiments, the fixed member is configured to be capable of being sealingly connected with the shielding layer of the cable.

Other advantages and technical effects of the cable connector and the electronic device of embodiments of the present application are described in detail in the specific implementations.

REFERENCE SIGNS

- 1—circuit board; 2—inner conductor; 3—signal connection contact; 4—grounding connection contact; 5—cable;
- 10—socket; 11—opening; 12—connection part; 13—first housing; 131—second connection part; 132—fixing part;
- 20—plug; 21—fixing member; 211—second housing; 212—insulator; 2121—insulating groove; 2122—first connection part; 22—elastic connection member; 221—fixing part; 222—first elastic contact part;

23—shielding partition; 231—isolation space; 232—second elastic contact part.

DETAILED DESCRIPTION

Herein, embodiments of the present application will be described in details, and examples of embodiments are shown in drawings. The embodiments described herein with reference to the drawings are illustrative, and used to explain the present application, and shall not be construed to limit the present application.

The implementation provides a cable connector configured to perform an electric signal connection of a cable 5 and a circuit board. The cable 5 may be a micro coaxial cable or a shielded twisted pair cable, and high-speed differential signals can usually be transmitted by using a dual-core micro coaxial cable. Each cable 5 may be single-core, double-core or multi-core, and a double-core cable is taken as an example in this implementation.

Figure 1:
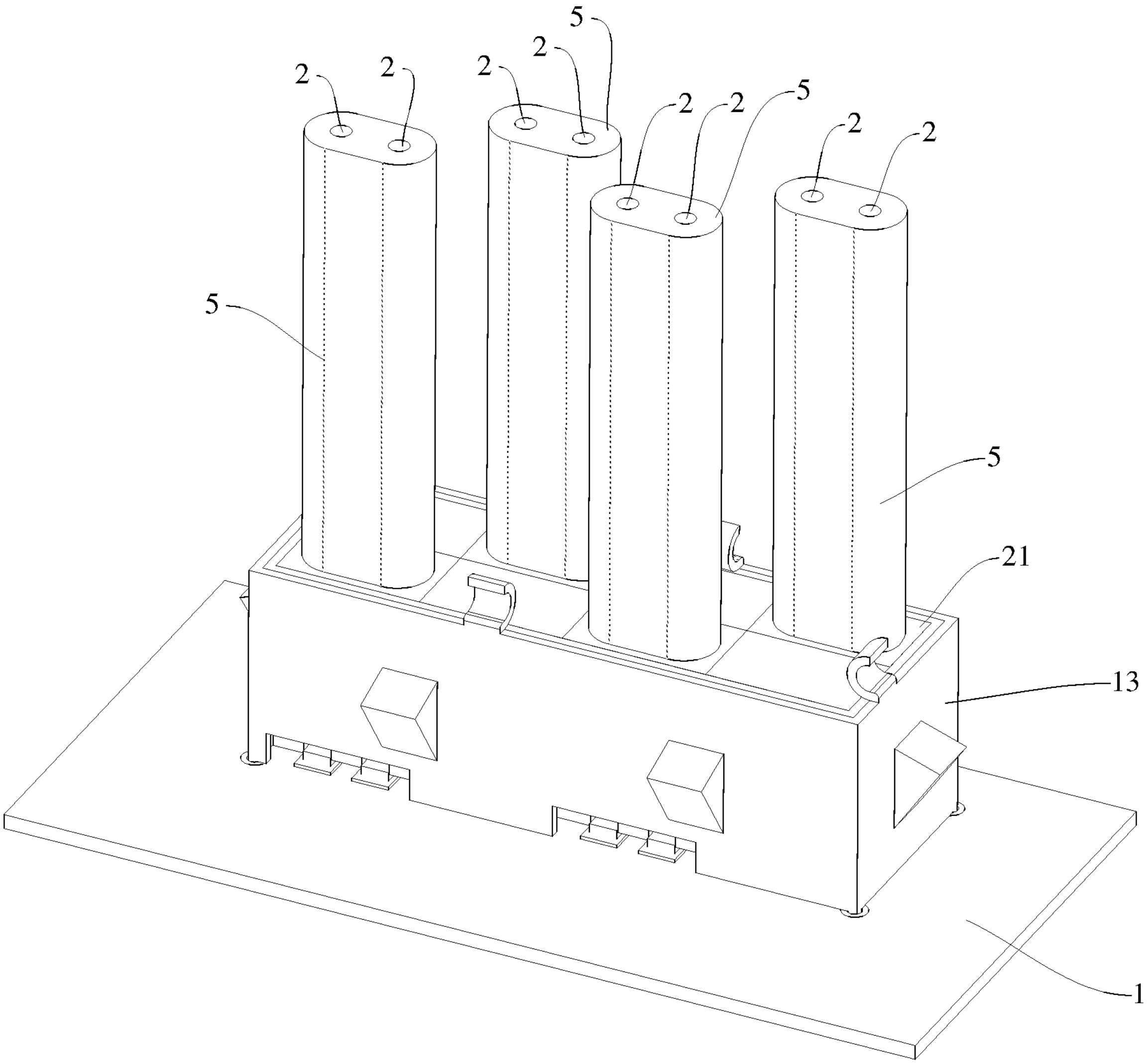
FIG. 1 is a schematic perspective view of a cable connector connecting a circuit board and a cable according to an embodiment of the present application.
Figure 2:
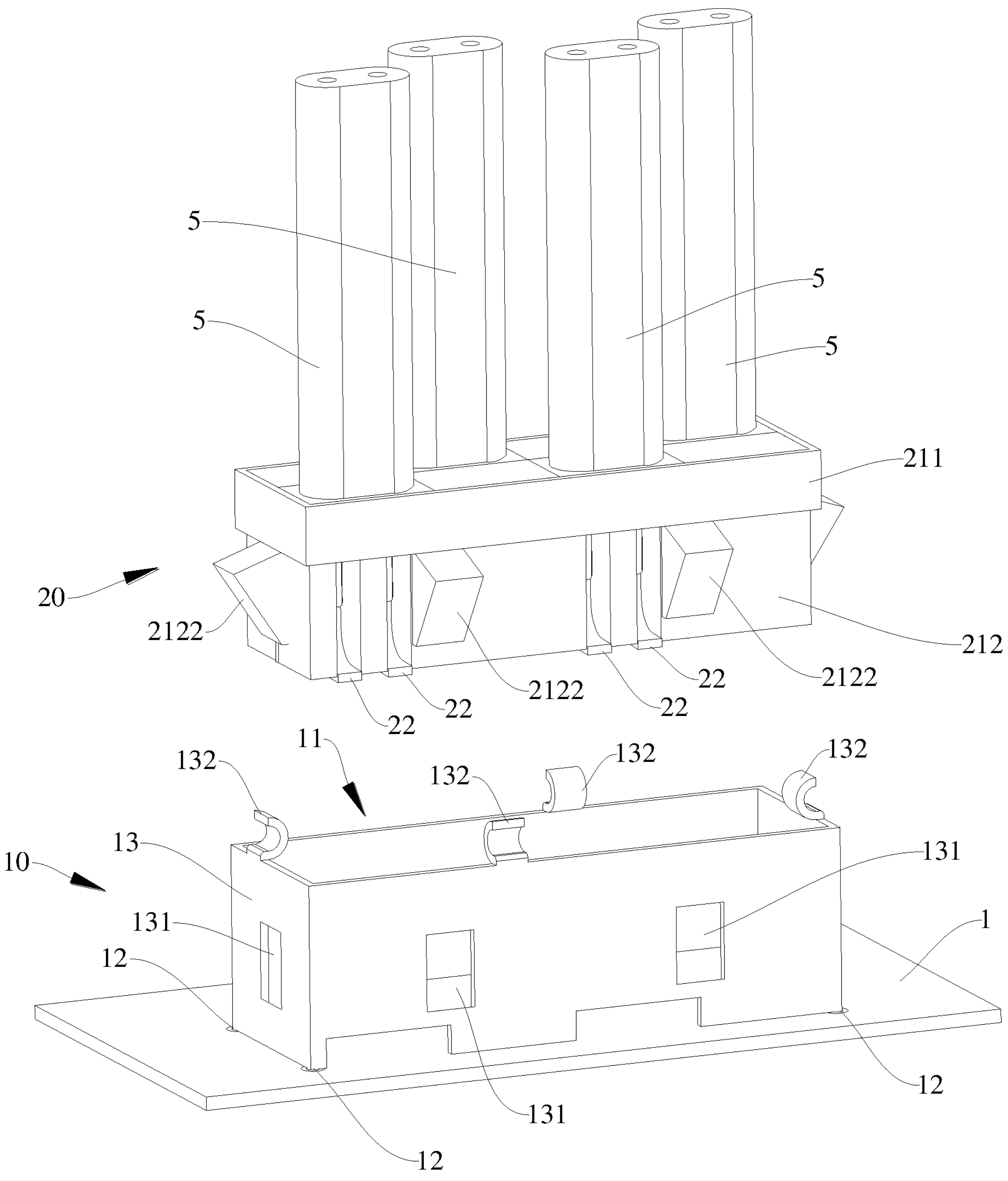
FIG. 2 is a schematic exploded perspective view of FIG. 1.
Figure 3:
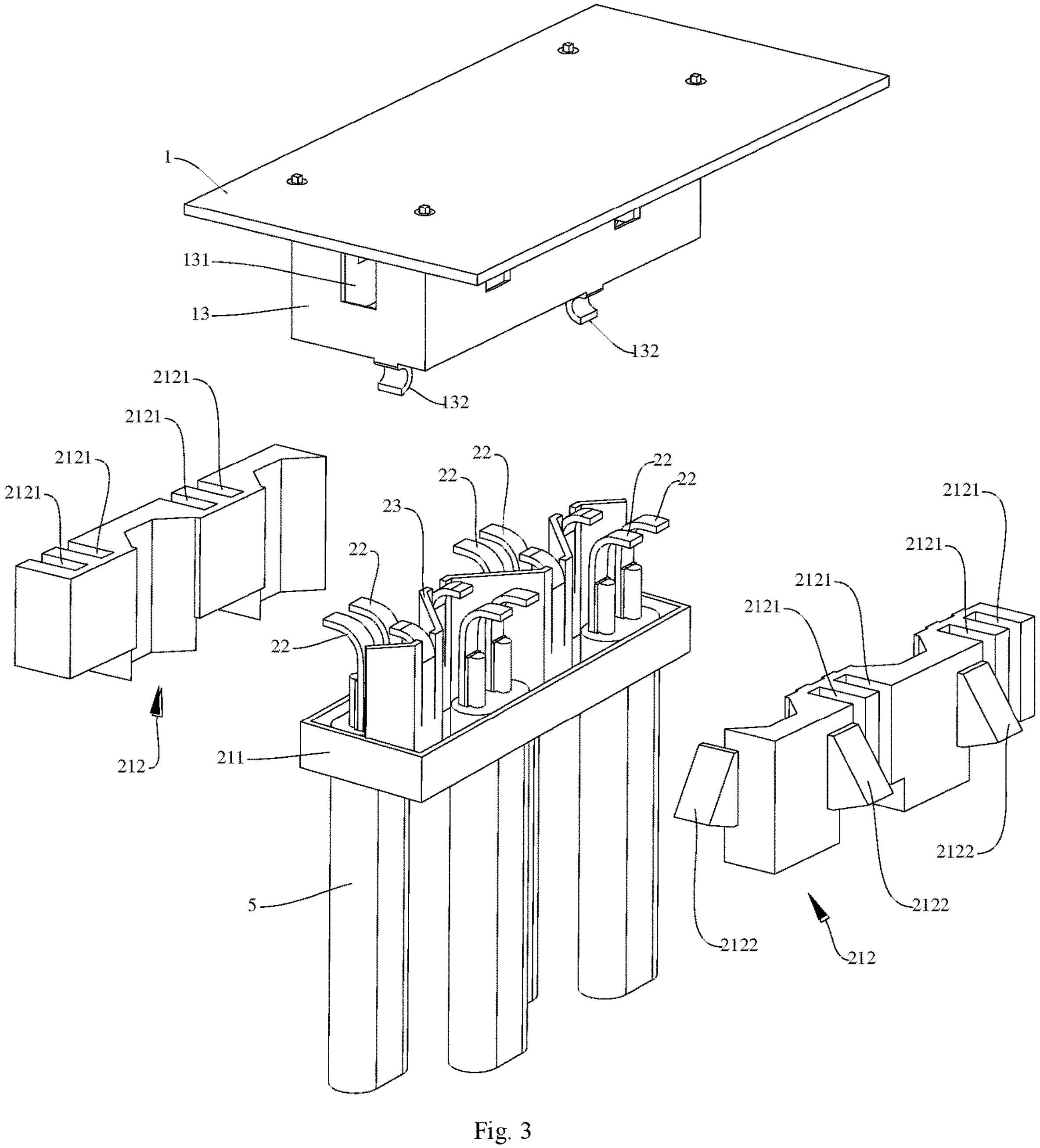
FIG. 3 is a schematic exploded perspective view of another explosion way of FIG. 1.
Figure 4:
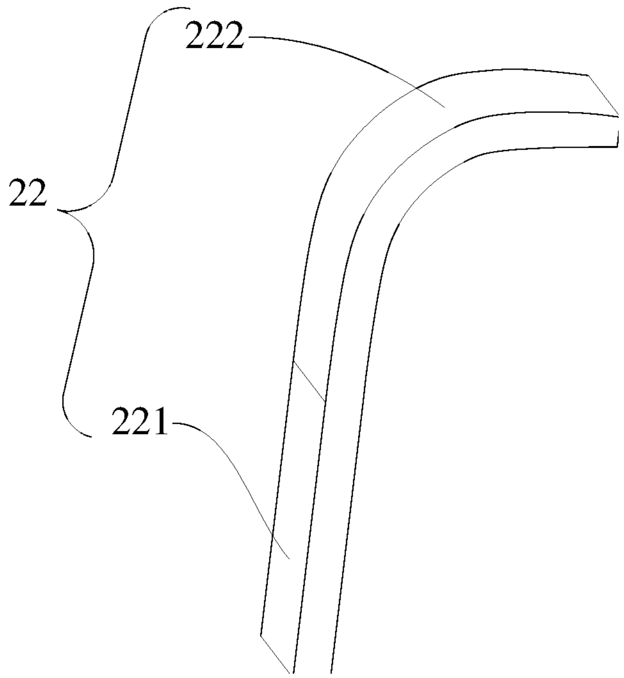
FIG. 4 is a schematic perspective view of an elastic connection member of a cable connector according to an embodiment of the present application.
Figure 8:
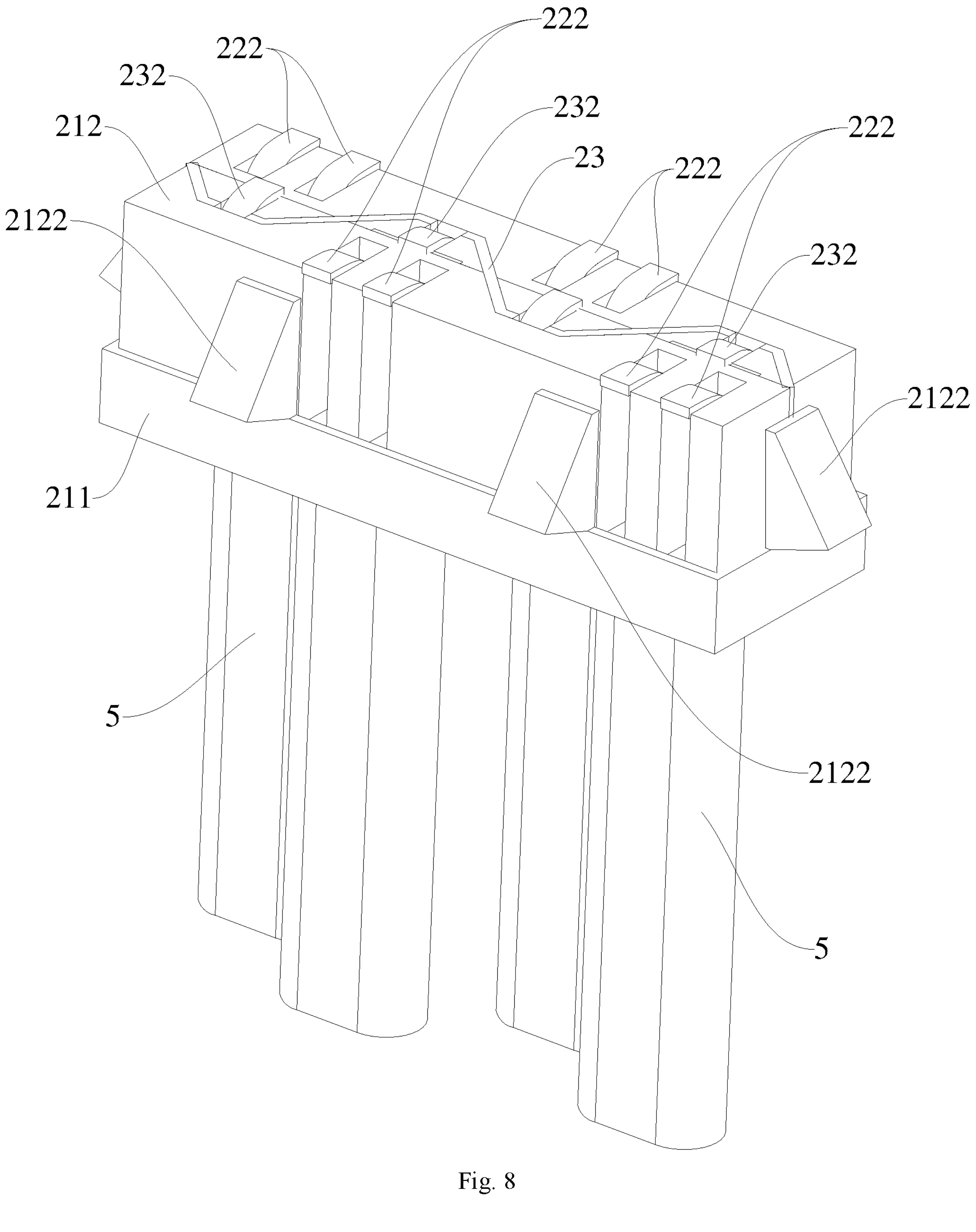
FIG. 8 is a schematic perspective view of a plug connecting a cable according to an embodiment of the present application.
Figure 9:
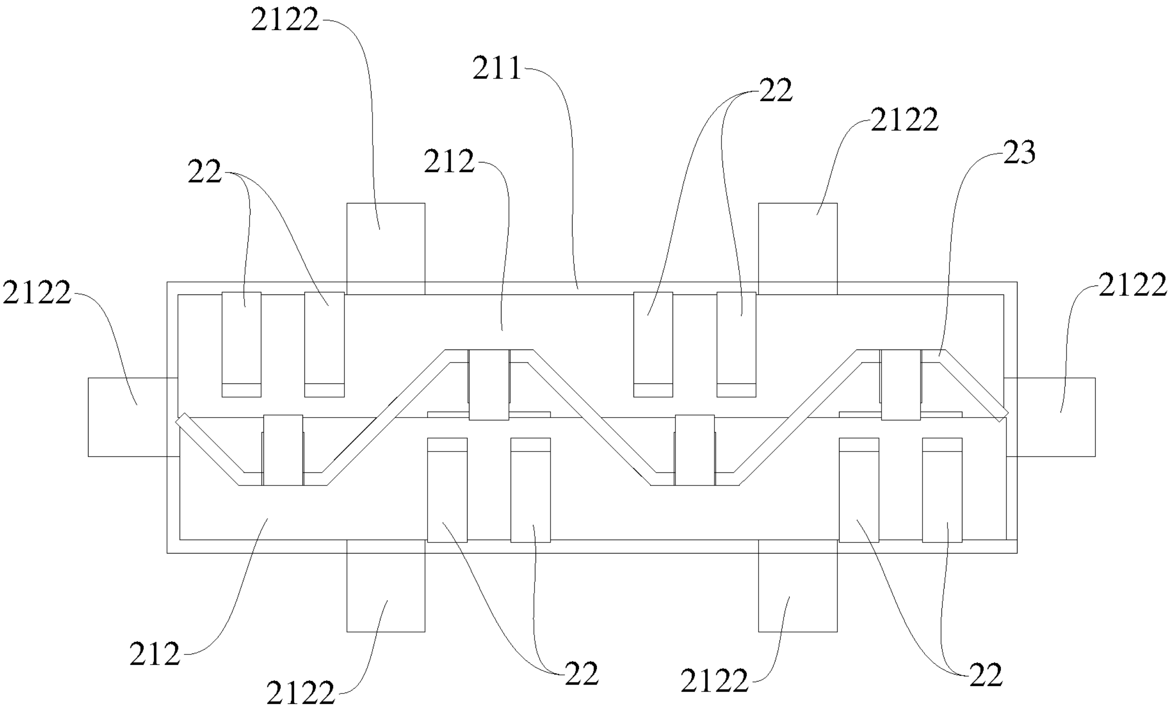
FIG. 9 is a top view of the plug connecting a cable according to an embodiment of the present application.
Figure 10:
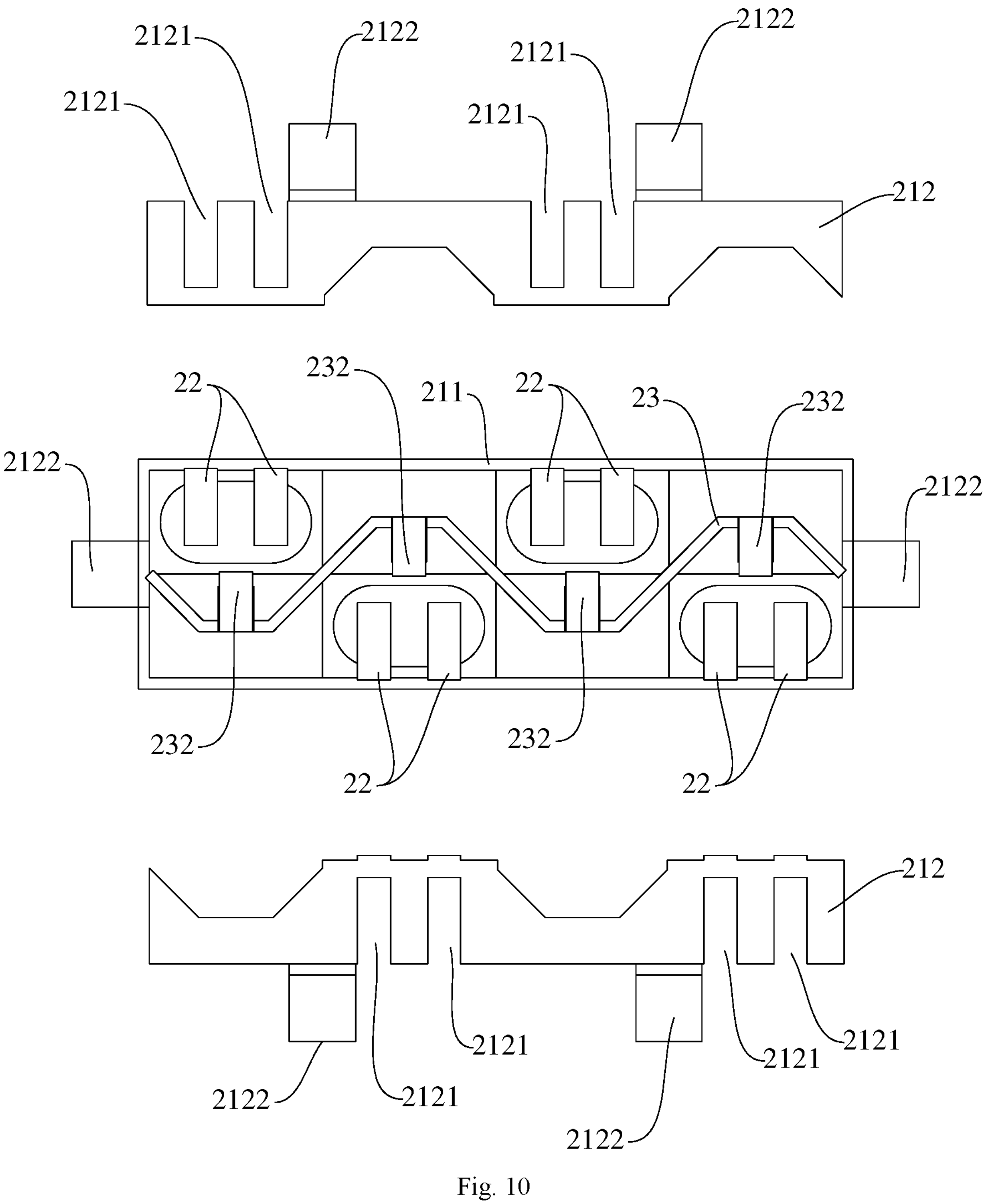
FIG. 10 is an exploded view of FIG. 9.

Referring to FIGS. 1-3, the cable connector provided by this implementation includes: a socket 10 and a plug 20. The socket 10 has an opening 11 and a connection part 12 configured to connect a circuit board 1. Referring to FIGS. 8-10, the plug 20 includes a fixing member 21 and an elastic connection member 22. The elastic connection member 22 includes a fixing part 221 and a first elastic contact part 222 connected with the fixing part 221, and the fixing part 221 is fixedly connected with the fixing member 21 and configured to connect an inner conductor 2 of the cable 5. The fixing member 21 may be connected with the socket 10, and enable the first elastic contact part 222 to elastically contact a signal connection contact 3 on the circuit board 1 through the opening 11 to form an electrical connection. From a point of view of signal transmission, the cable connector of this implementation has only two transfers, one is a connection from the inner conductor 2 of the cable 5 to the elastic connection member 22, and the other is an abutment from the first elastic contact part 222 of the elastic connection member 22 to the signal connection contact 3 of the circuit board 1. However, other connectors in the related art usually have three or more transfers. Therefore, the number of transfers in this implementation is reduced by at least one, which is beneficial to reducing the connection length of cable connector and the discontinuity of signal transmission. Further, the cable connector in this implementation is designed to shorten the connection length as much as possible, and it is possible to achieve the connection length of no more than 4 mm by adopting the scheme of this implementation. Shortening the connection length is beneficial to the impedance matching between the cable connector and the double-core coaxial line, thus improving the signal integrity.

In a specific embodiment, referring to FIG. 2, the socket 10 includes a first housing 13, on which the opening 11 and the connection part 12 are formed. The opening 11 is an opening for the insertion of the plug 20. At least a part of the plug 20 enters the first housing 13 through the opening 11 and forms a fit connection with the first housing 13, so that the first elastic contact part 222 may elastically contact the signal connection contact 3 on the circuit board 1. The elastic contact here means that the first elastic contact part 222 is pressed against the signal connection contact 3, and the first elastic contact part 222 is elastically deformed, thus ensuring that the first elastic contact part 222 always squeezes on the signal connection contact 3 when the plug 20 being connected with the socket 10. Specifically, the fixing member 21 may be connected with the first housing 13, and enable the first elastic contact part 222 to elastically contact the signal connection contact 3 on the circuit board 1 through the opening 11 to form the electrical connection. The first housing 13 is configured to connect with the circuit board 1 on one hand, and defines an insertion position of the plug 20 on the other hand, ensuring a good connection between the elastic connection member 22 of the plug 20 and the signal connection contact 3 of the circuit board 1.

Further referring to FIGS. 9 and 10, the fixing member 21 includes a second housing 211 and an insulator 212, and one end of the insulator 212 is fixed in the second housing 211. The insulator 212 defines an insulating groove 2121, and the elastic connection member 22 penetrates through the insulating groove 2121. One function of the insulator 212 is to ensure the insulation between the elastic connection members 22 and other conductive structures, and mainly to avoid short circuits among the plurality of elastic connection members 22. The insulator 212 may be designed based on an internal shape of the second housing 211, and specifically, it may be a base made of an insulating material (such as Liquid Crystal Polymer, LCP). The position of the elastic connection member 22 may also be supported and fixed by the insulator 212. The insulator 212 may be a single block or assembled from a plurality of blocks. In the drawings of this embodiment, the insulator 212 is assembled from a plurality of blocks.

Further, the second housing 211 and/or the insulator 212 may be connected with the first housing 13, and enable the first elastic contact part 222 to elastically contact the signal connection contact 3 on the circuit board 1 through the opening 11 to form the electrical connection. That is to say, it may be connected to the first housing 13 through the second housing 211, or through the insulator 212, or through both.

In this embodiment, the insulator 212 is interference-fitted in the second housing 211, so that the insulator 212 is fixed to the second housing 211 by interference fit method. A part of the insulator 212 is located inside the second housing 211, and the rest part extends out from the second housing 211.

Further, a first connection part 2122 is formed on the insulator 212 and/or the second housing 211. That is, the first connection part 2122 may be formed on the insulator 212, or may be formed on the second housing 211, or may be formed on both the insulator 212 and the second housing 211. The first housing 13 is provided with a second connection part 131 configured to form fit connection with the first connection part 2122. A plurality of first connection parts 2122 is provided, a plurality of second connection parts 131 is provided, which are in one-to-one correspondence.

Specifically, the first connection part 2122 is a protrusion structure formed on the insulator 212 and/or the second housing 211. In this embodiment, the protrusion structure is a wedge-shaped block; the second connection part 131 is a snapping slot defined in the first housing 13.

Figure 6:
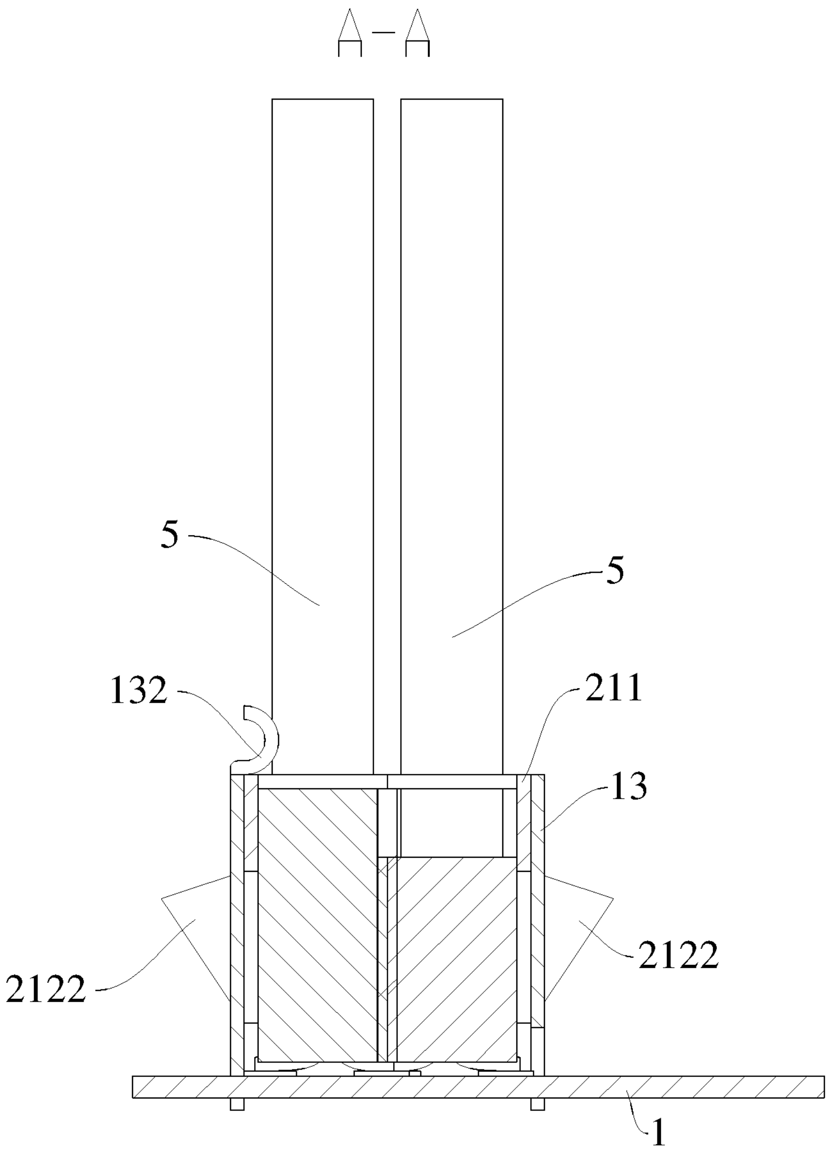
FIG. 6 is a schematic sectional view taken along A-A in FIG. 5.
Figure 7:
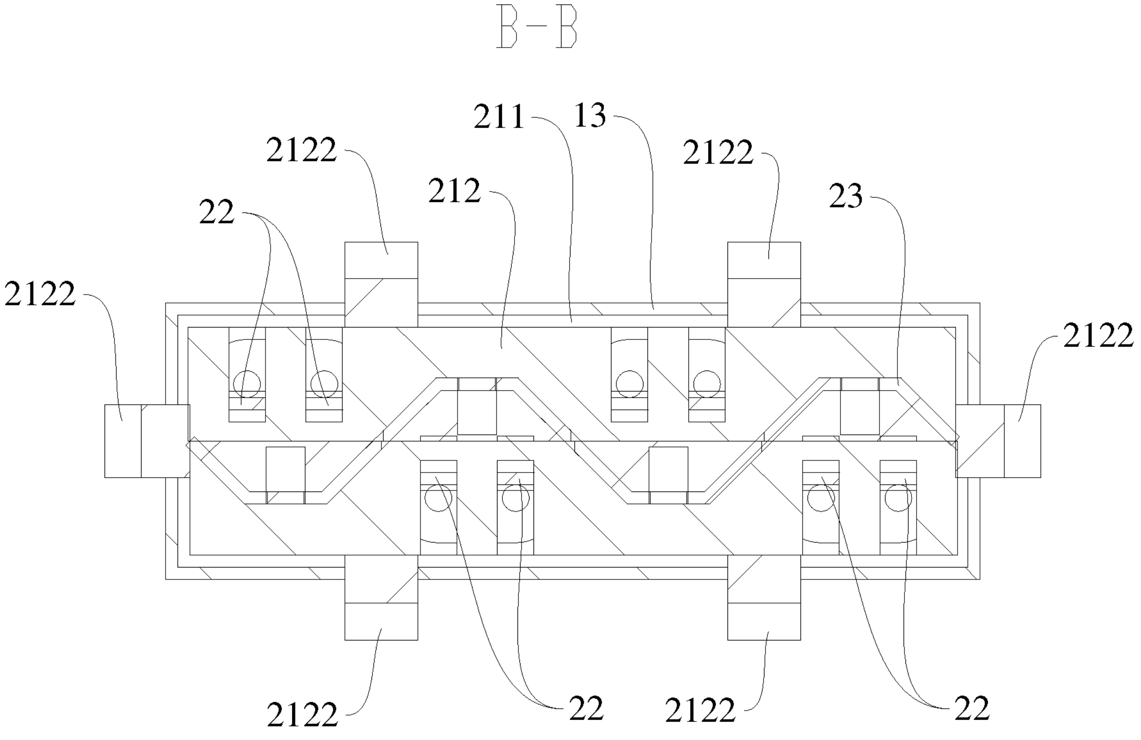
FIG. 7 is a schematic sectional view taken along B-B in FIG. 5.

With reference to FIGS. 1 and 6, in order to further improve the connection stability between the plug 20 and the socket 10, a fixing part 132 may also be provided on the first housing 13, and the fixing part 132 is used to fix the second housing 211 when the fixing member 21 is connected with the first housing 13. Specifically, the fixing part 132 is an elastic hook formed at a position of the opening 11 of the first housing 13, and may be pressed against the second housing 211 when the fixing member 21 is connected with the first housing 13. When the plug 20 is inserted into the socket 10, the elastic hook generates elastic deformation to allow the plug 20 to pass through, and reset to fix the second housing 211 after the plug 20 is completely inserted. In addition, provision of the fixing part 132 can ensure good electrical conductivity between the second housing 211 and the first housing 13.

In some specific embodiments, the first housing 13 and the second housing 211 are both shielding housings with signal shielding function, and both may be made of stainless steel metal sheets with a certain thickness.

In some specific embodiments, a plurality of elastic connection members 22 is provided, and divided into a plurality of groups separately fixedly connected with the fixing member 21, and each group contains at least one elastic connection member 22. A plurality of insulating grooves 2121 is provided, and each insulating groove 2121 is internally provided with one elastic connection member 22. Referring to FIGS. 3, and 7-10, the elastic connection members 22 are divided into four groups, and each group contains two elastic connection members 22.

Referring to FIGS. 9-12, the plug 20 further includes a shielding partition 23, and the shielding partition 23 is fixedly connected with the fixing member 21 and configured to isolate each group of elastic connection members 22. The shielding partition 23 may be fixed with the second housing 211, and they may be integrally formed by injection molding, thus improving the shielding effect and ensuring the stability of signal transmission.

Figure 11:
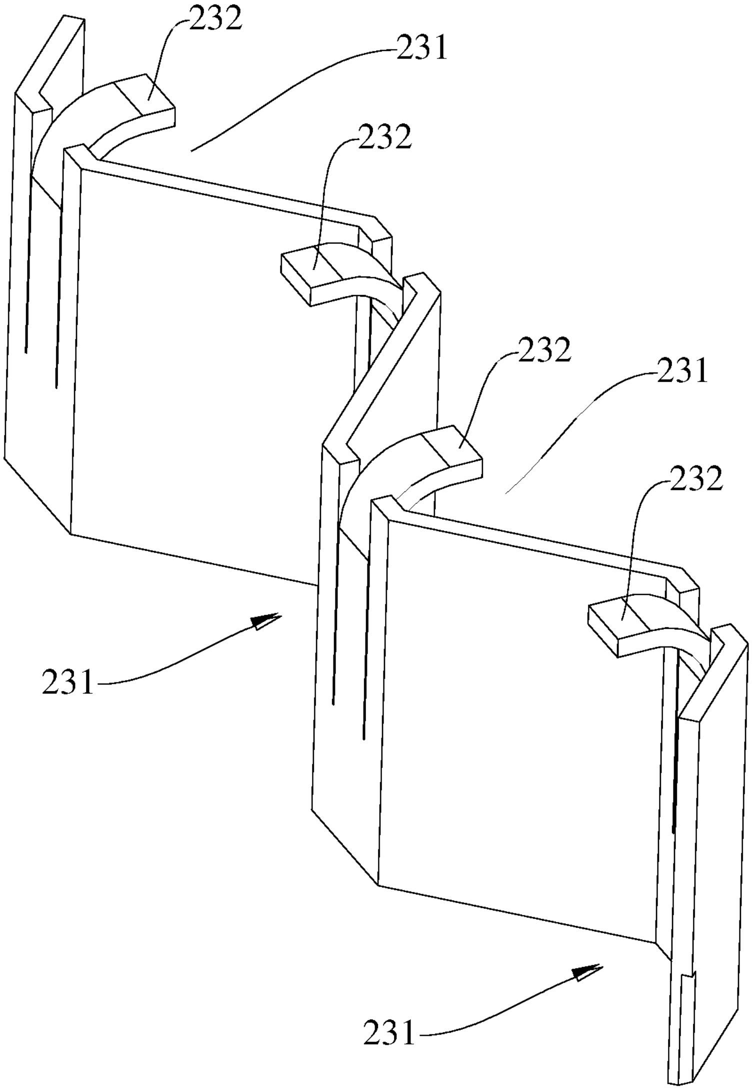
FIG. 11 is a schematic perspective view of a shielding partition according to an embodiment of the present application.
Figure 12:
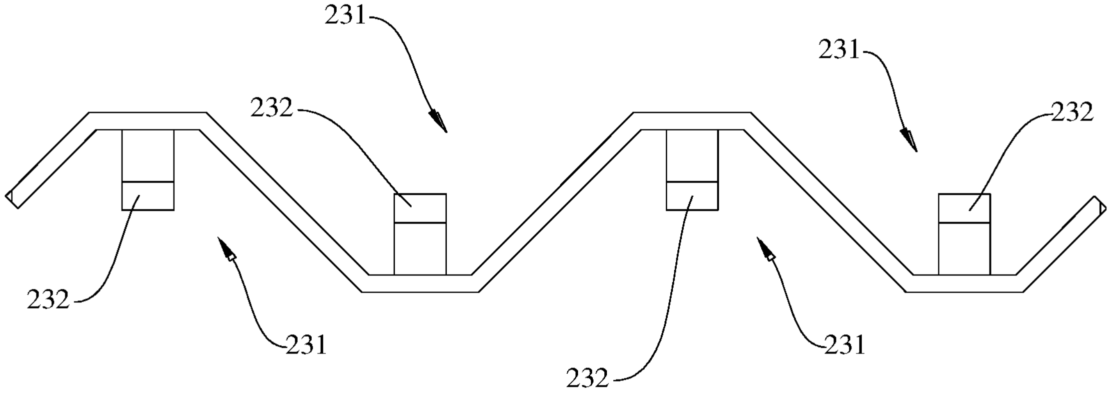
FIG. 12 is a top view of a shielding partition according to an embodiment of the present application.

Specifically, the shielding partition 23 is a metal plate, and the metal plate is bent to form a plurality of isolation spaces 231, and each isolation space 231 is internally provided with a group of elastic connection members 22. The metal plate may be an integral piece, or it may be formed by splicing a plurality of pieces. The shape of the shielding partition 23 may be wavy as shown in FIGS. 11-12.

Further, the shielding partition 23 has a second elastic contact part 232, and the second elastic contact part 232 is configured to elastically connect a grounding connection contact 4 on the circuit board 1, so that the shielding partition 23 also has a grounding function.

In order to ensure the insulation between the elastic connection member 22 and the shielding partition 23, in combination with FIGS. 8 and 10, a part of the structure of the insulator 212 may be arranged between the shielding partition 23 and the elastic connection member 22.

Further, all the elastic connection members 22 in each group of elastic connection members 22 have the same bending direction, and the elastic connection members 22 in adjacent groups have opposite bending directions. Therefore, horizontal forces exerted by the elastic connection members 22 on the circuit board 1 is in opposite directions, so that the horizontal forces can be counteracted, the connection stability is enhanced, and isolation between adjacent groups of elastic connection members 22 is facilitated.

Figure 13:
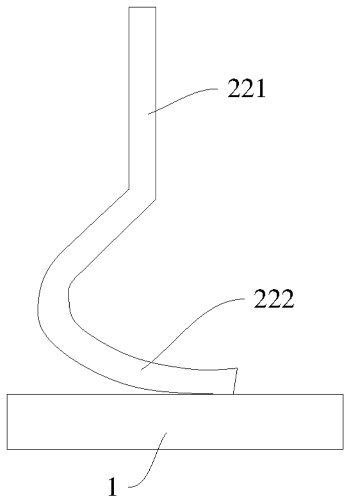
FIGS. 13-15 are schematic views of three examples of elastic contact between an elastic connection member and a circuit board according to an embodiment of the present application, respectively.
Figure 14:
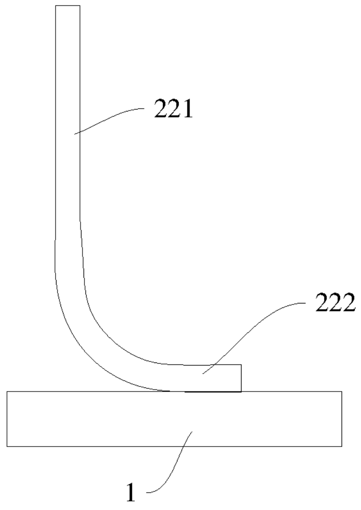
Figure 15:
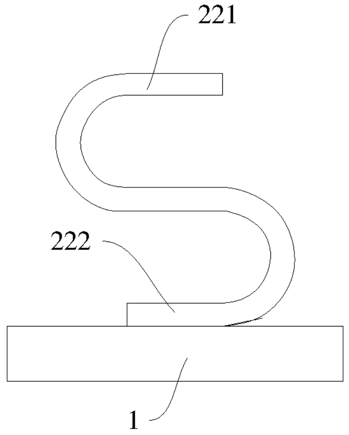

Referring to FIGS. 4 and 13-15, the first elastic contact part 222 has an arc-shaped structure, so that it is convenient for the first elastic contact part 222 to elastically contact the circuit board 1. Further, the elastic connection member 22 may have an S shape (as shown in FIG. 15), a C shape or an L-shape (as shown in FIG. 14). The first elastic contact part 222 may be C-shaped as shown in FIG. 13. These shapes present connection of an arc or an obtuse angle on the signal path, without any acute or right-angle turns, which is beneficial to reducing signal reflection. It should be noted that the S shape, C shape or L shape here is a general structural outline of the elastic connection member 22, and the actual elastic connection member 22 may have reasonable structural differences with the corresponding letters. Therefore, the present application does not limit the shape of the elastic connection member 22 to be exactly the same as the letter shape.

In order to reduce the connection length, the design requirement of the elastic connection member 22 in terms of mechanical structure is that the length should be as small as possible, so that it not only has enough contact pressure, but also has sufficient stroke range to ensure the reliability and stability of the connection. The design requirement of the elastic connection member 22 in circuit is to ensure that the characteristic impedance of the inner conductor 2 and the elastic connection member 22 in the cable connector matches the characteristic impedance of the cable.

Figure 5:
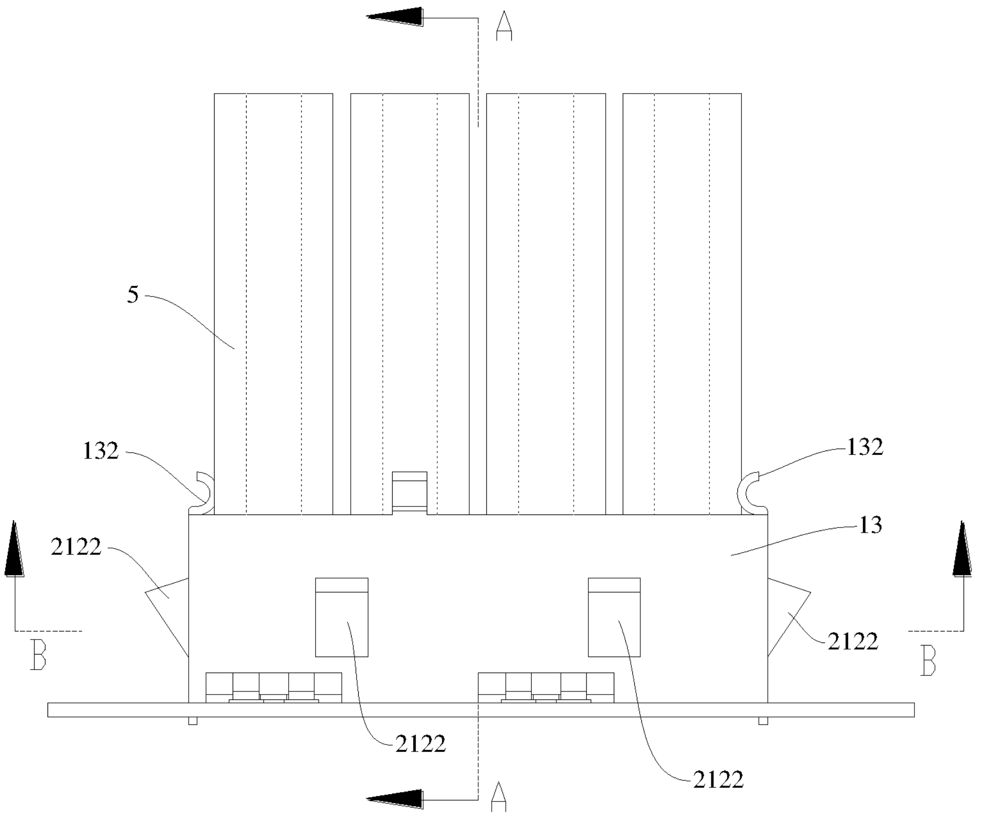
FIG. 5 is a front view of a cable connector connecting a circuit board and a cable according to an embodiment of the present application.

Referring to FIGS. 1 and 5-6, when the fixing member 21 is connected to the socket 10, the plug 20 is wholly located in the first housing 13. Therefore, the first housing 13 and the second housing 211 may cover and shield the elastic connection member 22 in all directions, which can ensure that when high-speed signals pass through, it will not radiate to the outside and avoid electromagnetic leakage and interference.

Figure 16:
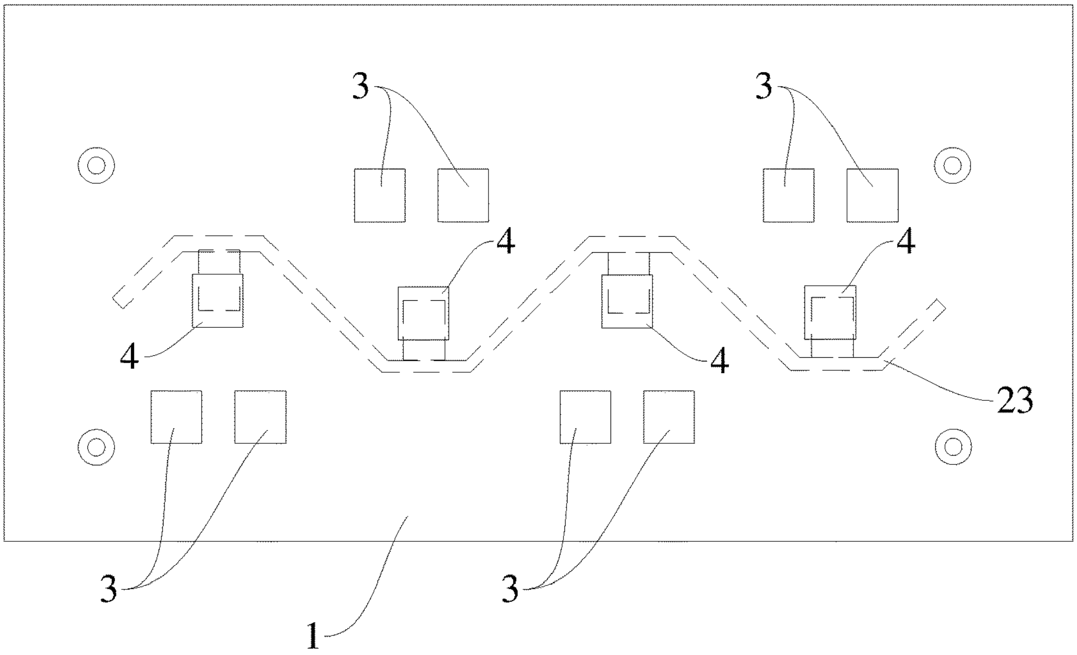
FIG. 16 is a schematic view of a circuit board according to an embodiment of the present application, in which a position of a shielding partition is shown.

The cable connector of this implementation also strengthens the design in terms of electromagnetic shielding. The first housing 13 and the second housing 211 in the cable connector achieve shielding from the outside. Inside the cable connector, the number of groups of elastic connection members 22 in the plug 20 is the same as the number of data channels in the cable. In order to prevent signal crosstalk between channels, the left and right sides and the back side of each group of elastic connection members 22 are provided with the shielding partition 23 to isolate different groups of elastic connection members 22 from each other. As shown in FIG. 16 in combination with FIGS. 11 and 12, in order to simplify the design of the shielding partition 23, only one wavy metal plate may be used to isolate four groups of elastic connection members 22, and on average each group of elastic connection members 22 has a second elastic contact part 232 around it. The circuit board is correspondingly provided with signal connection contacts 3 and grounding connection contacts 4. The position of the shielding partition 23 is schematically shown in FIG. 16. Signal connection contact 3 and grounding connection contact 4, also called golden fingers, are a kind of gold-plated pads or contacts on the circuit board. Here, they are distinguished according to their functions.

The signal connection contacts 3 for each group of elastic connection members 22 and the grounding connection contact 4 for the second elastic contact part 232 (also called a grounding part) are distributed in a stagger arrangement. By setting the shape of the shielding partition 23 as described above and increasing the number of grounding parts on the shielding partition 23, the shielding between each data channel can be further strengthened.

Figure 17:
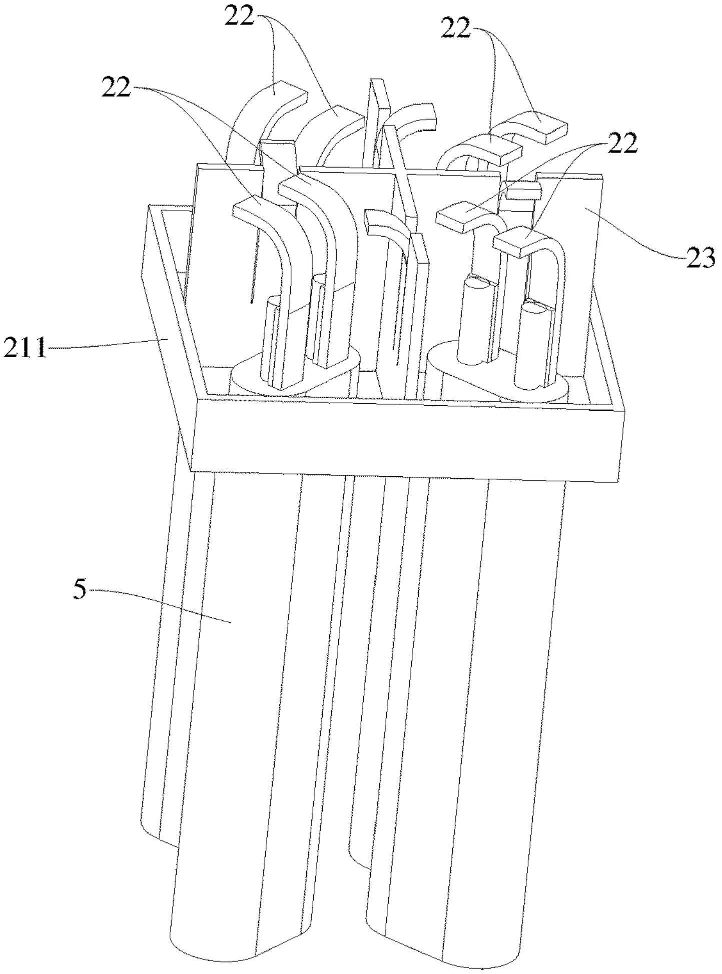
FIG. 17 is a schematic perspective view of a plug connecting a cable according to another embodiment of the present application.
Figure 18:
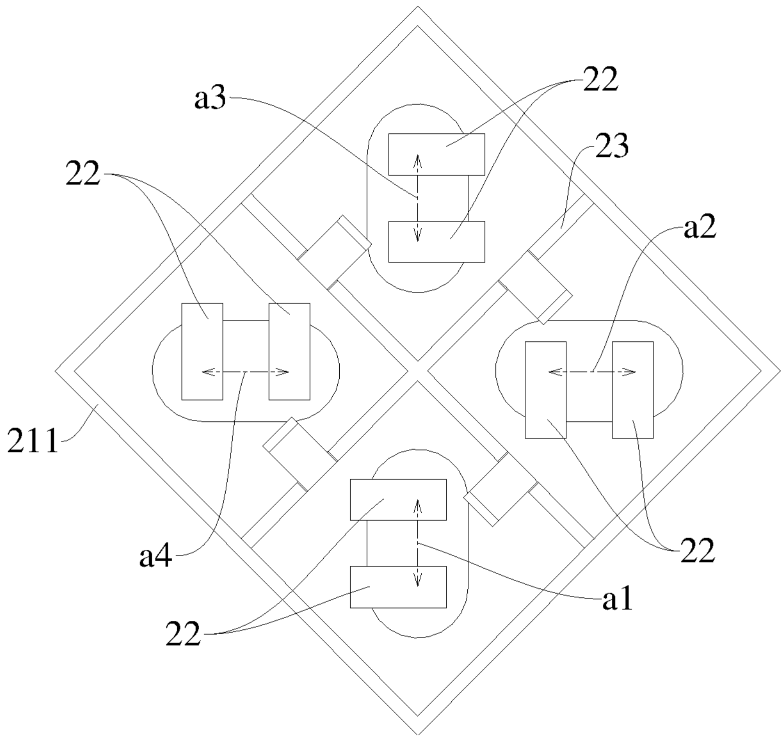
FIG. 18 is a top view of the plug connecting the cable in FIG. 17.

In order to reduce the inductive coupling between two groups of elastic connection members 22, the spatial arrangement of two adjacent groups of elastic connection members can be further adjusted. Referring to FIGS. 17-18, each group of elastic connection members includes two elastic connection members 22 distributed at intervals along the interval direction; an angle between the interval directions of any two adjacent groups of elastic connection members has a range of 85°-95°. The optimum value is 90°. That is to say, the interval directions of any two adjacent groups of elastic connection members are perpendicular or nearly perpendicular to each other.

Figure 19:
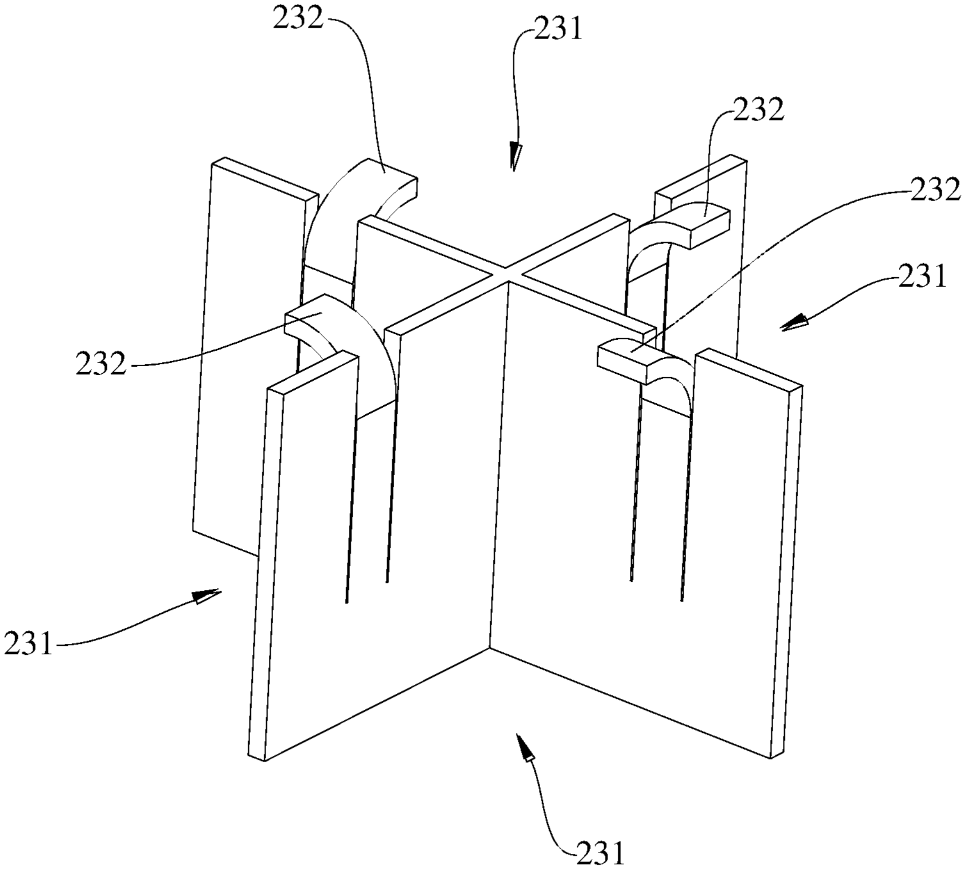
FIG. 19 is a schematic perspective view of a shielding partition in FIG. 17.

As shown in FIG. 18, the cable connector is provided with four groups of elastic connection members, each group contains two elastic connection members 22, and the interval directions of the four groups of elastic connection members are respectively denoted as a1, a2, a3 and a4, with the interval direction a1 perpendicular to the interval directions a2 and a4, and the interval direction a3 perpendicular to the interval directions a2 and a4. Referring to FIG. 19, the shielding partition 23 is correspondingly shaped like a cross partition, forming four isolation spaces 231. In other embodiments, the cable connector may be provided with more groups of elastic connection members, and correspondingly, the shielding partition 23 also forms more isolation spaces 231. Those skilled in the art can make corresponding expansion according to the inventive concept of the present application.

Based on the description of the cable connector, this implementation further provides an electronic device, and the electronic device includes a circuit board 1, a cable 5 and a cable connector according to the implementation. An inner conductor 2 of the cable 5 is welded with the fixing part 221, the first housing 13 of the cable connector is fixed on the circuit board 1 through the connection part 12, and the plug 20 of the cable connector is plugged into the socket 10.

In some embodiments, the fixing member 21 is configured to be capable of sealingly connected with a shielding layer of the cable 5. Specifically, the shielding layer on an outer surface of the cable 5 is sealingly connected with the second housing 211, so that the shielding layer on the outer surface of the cable 5 may be integrated with the second housing 211 without leaving any gap between them, to ensure shielding effect to the greatest extent. If some processes cannot make it possible to leave no gap between them, the sealing may be made to the greatest extent based on the current processes. If there are other design requirements for the shielding layer on the outer surface of the cable 5, the shielding layer on the outer surface of the cable 5 may be at least partially sealed with the second housing 211.

In the description of the present application, it should be understood that terms such as "central", "longitudinal", "transverse", "length", "up", "down", "front", "rear", "right", "left", "vertical", "horizontal", "top", "bottom", "inner", "outer", etc. refer to the orientation as then described or as shown in the drawings under discussion, these relative terms are for convenience of description and do not indicate or imply that the devices or elements must be in specific direction, or must be configured or operated in a particular orientation. Therefore should not be construed to limits to the present application.

In addition, terms such as "first" and "second" are used for purposes of description and are not intended to indicate or imply relative importance or implicitly indicate the number of technical features indicated. Therefore, the features defined as "first" and "second" can explicitly or implicitly include at least one of these features. In the description of this application, the term "a plurality of" means at least two, such as two, three, etc., unless otherwise specifically defined.

In the present application, unless specified or limited otherwise, terms "mounted," "connected," "coupled" and "fixed" and variations thereof are used broadly, for example, it can be fixed connection, can also be detachable connection, or integrated; it can be mechanically connected, electrically connected or communicated with each other; it can be directly connected or indirectly connected through an intermediary, and it can be the internal connection of two elements or the interaction between two elements, unless otherwise specified. For those skilled in the art, the specific meanings of the above terms in this application can be understood according to the specific circumstances.

In the present application, unless otherwise specified and limited, the first feature "on" or "below" the second feature may be that the first and second features are in direct contact, or the first and second features are in indirect contact through an intermediary. Moreover, the first feature is "on", "above" and "on top of" the second feature, which can mean that the first feature is directly above or obliquely above the second feature, or just means that the horizontal height of the first feature is higher than the second feature. The first feature is "below", "under" and "on bottom of" the second feature can mean that the first feature is directly or obliquely below the second feature, or just means that the horizontal height of the first feature is smaller than the second feature.

In the present application, terms such as "an embodiment," "some embodiments," or "some examples," mean that a specific feature, structure, material or characteristic described in connection with this embodiment or example is included in at least one embodiment or example of the present application. In the specification, the schematic expressions of the above terms are not necessarily aimed at the same embodiment or example. Moreover, the specific features, structures, materials or characteristics described may be combined in any one or more embodiments or examples in a suitable manner. In addition, those skilled in the art can integrate and combine different embodiments or examples and features of different embodiments or examples described in this specification without contradicting each other.

Although embodiments have been shown and described above, it would be appreciated that the above embodiments are illustrative, and cannot be construed to limit the present application, and changes, alternatives, and modifications can be made in the embodiments by skilled in the art in the scope of the present application.

What is claimed is:

1. A cable connector, comprising:

a socket having an opening and a connection part configured to connect with a circuit board; and a plug including a fixing member and an elastic connection member; the elastic connection member comprising a fixing part and a first elastic contact part connected with the fixing part, and the fixing part being fixedly connected with the fixing member and configured to connect with an inner conductor of a cable;

wherein the fixing member is configured to be connected with the socket, and enable the first elastic contact part to elastically contact a signal connection contact on the circuit board through the opening to form an electrical connection, wherein a plurality of elastic connection members are provided, and divided into a plurality of groups separately fixedly connected with the fixing member, and each group contains at least one elastic connection member, wherein the plug further comprises a shielding partition, and the shielding partition is fixedly connected with the fixing member and configured to isolate the plurality of groups of elastic connection members, and wherein the shielding partition is a metal plate, and the metal plate is bent to form a plurality of isolation spaces, and each isolation space is internally provided with one group of elastic connection members.

2. The cable connector according to claim 1, wherein the socket comprises a first housing, and the opening and the connection part are formed on the first housing; and the fixing member is configured to be connected with the first housing, and enable the first elastic contact part to elastically contact the signal connection contact on the circuit board through the opening to form the electrical connection.

3. The cable connector according to claim 2, wherein the fixing member includes a second housing and an insulator, one end of the insulator is fixed in the second housing, the insulator defines an insulating groove, and the elastic connection member penetrates through the insulating groove; and at least one of the second housing or the insulator is configured to be connected with the first housing, and enable the first elastic contact part to elastically contact the signal connection contact on the circuit board through the opening to form the electrical connection.

4. The cable connector according to claim 3, wherein the insulator is interference-fitted within the second housing.

5. The cable connector according to claim 3, wherein a first connection part is formed on at least one of the insulator or the second housing, and a second connection part configured to form fit connection with the first connection part is provided on the first housing.

6. The cable connector according to claim 5, wherein the first connection part is a protrusion structure formed on at least one of the insulator or the second housing, and the second connection part is a snapping slot defined on the first housing.

7. The cable connector according to claim 3, wherein the first housing has a fixing part, and the fixing part is configured to fix the second housing when the fixing member is connected with the first housing.

8. The cable connector according to claim 7, wherein the fixing part is an elastic hook formed at a position of the opening of the first housing, and configured to press on the second housing when the fixing member is connected with the first housing.

9. The cable connector according to claim 3, wherein a plurality of insulating grooves are provided, and each insulating groove is internally provided with one elastic connection member.

10. The cable connector according to claim 1, wherein the shielding partition has a second elastic contact part, and the second elastic contact part is configured to elastically connect a grounding connection contact on the circuit board.

11. The cable connector according to claim 1, wherein a part of the insulator is located between the shielding partition and the elastic connection member.

12. The cable connector according to claim 9, wherein all the elastic connection members in each group of elastic connection members have a same bending direction, and the elastic connection members in adjacent groups have opposite bending directions.

13. The cable connector according to claim 9, wherein each group of elastic connection members include two elastic connection members distributed at intervals along an interval direction; and an angle between the interval directions of any two adjacent groups of elastic connection members has a range of 85°-95°.

14. The cable connector according to claim 2, wherein the plug is wholly located in the first housing when the fixing member is connected with the socket.

15. The cable connector according to claim 1, wherein the first elastic contact part has an arc structure.

16. The cable connector according to claim 15, wherein the elastic connection member has an S shape, a C shape, or an L shape.

17. An electronic device comprising: a circuit board, a cable and a cable connector comprising:

a socket having an opening and a connection part connected with the circuit board; and a plug including a fixing member and an elastic connection member; the elastic connection member comprising a fixing part and a first elastic contact part connected with the fixing part, and the fixing part being fixedly connected with the fixing member and connected with an inner conductor of the cable;

wherein the fixing member is configured to be connected with the socket, and enable the first elastic contact part to elastically contact a signal connection contact on the circuit board through the opening to form an electrical connection, wherein a plurality of elastic connection members are provided, and divided into a plurality of groups separately fixedly connected with the fixing member, and each group contains at least one elastic connection member, wherein the plug further comprises a shielding partition, and the shielding partition is fixedly connected with the fixing member and configured to isolate the plurality of groups of elastic connection members, and wherein the shielding partition is a metal plate, and the metal plate is bent to form a plurality of isolation spaces, and each isolation space is internally provided with one group of elastic connection members.

18. The electronic device according to claim 17, wherein the fixing member is configured to be sealingly connected with a shielding layer of the cable.

* * * * *